United States Patent
Korkishko et al.

(10) Patent No.: US 9,832,651 B2
(45) Date of Patent: Nov. 28, 2017

(54) SYSTEM AND METHOD FOR VERIFYING INTEGRITY OF SOFTWARE PACKAGE IN MOBILE TERMINAL

(75) Inventors: Tymur Korkishko, Gyeonggi-do (KR); Kyung-Hee Lee, Yongin-si (KR)

(73) Assignee: Samsung Electronics Co., Ltd (KR)

(*) Notice: Subject to any disclaimer, the term of this patent is extended or adjusted under 35 U.S.C. 154(b) by 781 days.

(21) Appl. No.: 12/761,874

(22) Filed: Apr. 16, 2010

(65) Prior Publication Data
US 2010/0287547 A1   Nov. 11, 2010

(30) Foreign Application Priority Data

May 8, 2009   (KR) .................. 10-2009-0040405

(51) Int. Cl.
*H04W 12/10* (2009.01)
*G06F 21/57* (2013.01)
*H04L 29/06* (2006.01)

(52) U.S. Cl.
CPC ............ *H04W 12/10* (2013.01); *G06F 21/57* (2013.01); *H04L 63/12* (2013.01)

(58) Field of Classification Search
CPC .................................................. H04W 12/10
See application file for complete search history.

(56) References Cited

U.S. PATENT DOCUMENTS

| | | | |
|---|---|---|---|
| 5,825,877 A * | 10/1998 | Dan et al. ................. | 705/54 |
| 6,157,721 A | 12/2000 | Shear et al. | |
| 6,223,291 B1 * | 4/2001 | Puhl et al. ................. | 726/28 |
| 6,553,375 B1 | 4/2003 | Huang et al. | |
| 6,694,434 B1 * | 2/2004 | McGee et al. ............. | 713/189 |
| 6,931,545 B1 * | 8/2005 | Ta et al. .................... | 726/10 |
| 7,409,208 B1 * | 8/2008 | Clare et al. ............... | 455/419 |

(Continued)

FOREIGN PATENT DOCUMENTS

| | | |
|---|---|---|
| CN | 1 449 523 | 10/2003 |
| CN | 101167290 | 4/2008 |

(Continued)

OTHER PUBLICATIONS

Korean Office Action dated Mar. 30, 2015 issued in counterpart application No. 10-2009-0040405.

*Primary Examiner* — Jacob C. Coppola
(74) *Attorney, Agent, or Firm* — The Farrell Law Firm, P.C.

(57) ABSTRACT

A method and system for verifying integrity of a software package in a mobile terminal is provided. The method includes receiving a catalog of available software packages from a distributor and displaying the catalog, if a desired software package to be installed is selected from the displayed catalog, acquiring a software package IDentifier (ID) corresponding to the selected software package from the catalog, transmitting the software package ID to the distributor to receive the selected software package corresponding to the software package ID and to transmit the software package ID to a verification authority, receiving, from the verification authority, integrity evidence information corresponding to the software package ID and verifying the integrity of the selected software package, and outputting a notification for notifying a user of a result of the verification and managing the selected software package according to a received user selection.

24 Claims, 4 Drawing Sheets

(56) References Cited

U.S. PATENT DOCUMENTS

| | | | |
|---|---|---|---|
| 2001/0051928 A1* | 12/2001 | Brody | 705/52 |
| 2002/0138554 A1* | 9/2002 | Feigen et al. | 709/203 |
| 2003/0009687 A1* | 1/2003 | Ferchau et al. | 713/200 |
| 2003/0099358 A1* | 5/2003 | Michael | G06F 21/572 |
| | | | 380/270 |
| 2004/0111618 A1* | 6/2004 | Vaha-Sipila | 713/176 |
| 2004/0117612 A1* | 6/2004 | Falk | H04L 63/10 |
| | | | 713/150 |
| 2005/0004875 A1* | 1/2005 | Kontio et al. | 705/52 |
| 2005/0154759 A1* | 7/2005 | Hofmeister et al. | 707/104.1 |
| 2005/0262086 A1* | 11/2005 | Ta et al. | 707/9 |
| 2006/0200814 A1* | 9/2006 | Kontinen et al. | 717/168 |
| 2007/0240217 A1* | 10/2007 | Tuvell et al. | 726/24 |
| 2007/0240222 A1* | 10/2007 | Tuvell et al. | 726/24 |
| 2008/0077801 A1* | 3/2008 | Ekberg | 713/187 |
| 2009/0254993 A1* | 10/2009 | Leone | 726/25 |
| 2010/0058468 A1* | 3/2010 | Green et al. | 726/22 |
| 2010/0211772 A1* | 8/2010 | Johansson et al. | 726/21 |

FOREIGN PATENT DOCUMENTS

| | | | | |
|---|---|---|---|---|
| EP | 1420323 A1 * | 5/2004 | | G06F 1/00 |
| JP | 2000-163269 | 6/2000 | | |
| WO | WO 02/19598 | 3/2002 | | |

\* cited by examiner

SYSTEM AND METHOD FOR VERIFYING INTEGRITY OF SOFTWARE PACKAGE IN MOBILE TERMINAL

PRIORITY

This application claims priority under 35 U.S.C. §119(a) to a Korean Patent Application filed in the Korean Intellectual Property Office on May 8, 2009 and assigned Serial No. 10-2009-0040405, the entire disclosure of which is incorporated herein by reference.

BACKGROUND OF THE INVENTION

1. Field of the Invention

The present invention relates to computer security for safely protecting an execution environment of a mobile terminal. More particularly, the present invention relates a system and method for protecting an execution environment of a mobile terminal from a potential damage to software packages based on a computer security technique for verifying the integrity of a software package.

2. Description of the Related Art

Some conventional technologies for verification of software package integrity are based on digital authentication technologies. One such conventional technology is described in U.S. Pat. No. 6,157,721, titled "Systems and Methods using Cryptography to Protect Secure Computing Environments" to Shear et al. (hereinafter, "Shear"). According to Shear, at least one trusted verifying authority validates a software package by analyzing and/or testing the software package. The trusted verification authority digitally signs and certifies that the software package has been verified. After the digital signing, a processing environment of a mobile terminal verifies a signature of the verification authority, and accepts execution and manipulation of the software package in case of a success in the verification or rejects the software package in case of a failure in the verification.

Some conventional techniques for use of the digital signature are based on an encryption algorithm using a public key. The trusted verification authority has two keys such as a public key and a private key, such that the private key is used for encrypting a hash value of the package, and the public key is distributed in the processing environment of the mobile terminal. The encrypted hash value is designated as a certificate of the package. The processing environment of the mobile terminal receives the software package, decrypts a code for the signature of the received software package by using the public key received from the verification authority, and obtains the original hash value of the software package. The processing environment of the mobile terminal calculates the current hash value of the software package and compares the calculated current hash value with the original hash value. If they match, the signature authentication process is regarded as being successful. If they do not match, the signature authentication process fails. Therefore, through the authentication of the digital signature by the processing environment of the mobile terminal, it can be determined whether the software package has not been changed.

However, conventional methods, such as the method of Shear, require a complex public key structure for public key distribution and verification by a verification authority. Moreover, digital signature authentication based on a code of a public key requires a complex modular operation, which increases the number of operations and time required for processing the software package. Accordingly, the conventional methods are not suitable for application to certain execution environments, such as in a mobile terminal.

SUMMARY OF THE INVENTION

An aspect of the present invention is to solve at least the above problems and/or disadvantages and to provide at least the advantages described below. Accordingly, an aspect of the present invention is to provide a method for verifying the integrity of a software package without a complex public key structure and a modular operation, thereby minimizing a required capacity of a storage space such as a memory and delay time caused by the integrity verification.

According to an aspect of the present invention, there is provided a method for verifying the integrity of a software package in a mobile terminal. The method includes receiving a catalog of available software packages from a distributor through wired or wireless communication and displaying the catalog, if a desired software package to be installed is selected from the displayed catalog, acquiring a software package IDentifier (ID) corresponding to the selected software package from the catalog, transmitting the software package ID to the distributor to receive the selected software package corresponding to the software package ID and to transmit the software package ID to a verification authority, receiving integrity evidence information corresponding to the software package ID from the verification authority and verifying the integrity of the selected software package, and outputting a notification for notifying a user of a result of the verification and managing the selected software package according to a received selection.

According to another aspect of the present invention, a system for verifying integrity of a software package in a mobile terminal is provided. The system includes the mobile terminal for receiving a catalog of available software packages and displaying the catalog, acquiring a software package IDentifier (ID) corresponding to the selected software package from the catalog if a desired software package to be installed is selected from the displayed catalog, transmitting the software package ID to the distributor, receiving integrity evidence information corresponding to the software package ID, verifying the integrity of the selected software package, outputting a notification for notifying a user of a result of the verification, and managing the selected software package according to a received user selection; the distributor for transmitting the catalog to the mobile terminal, receiving the selected software package corresponding to the software package ID, and transmitting the software package ID to the verification authority; and the verification authority for transmitting the integrity evidence information to the mobile terminal.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. It should be noted that identical components, although being illustrated in different drawings, are referred to as identical reference numerals and symbols. Detailed descriptions of well-known functions and constructions are omitted for clarity and conciseness.

Figure 1:
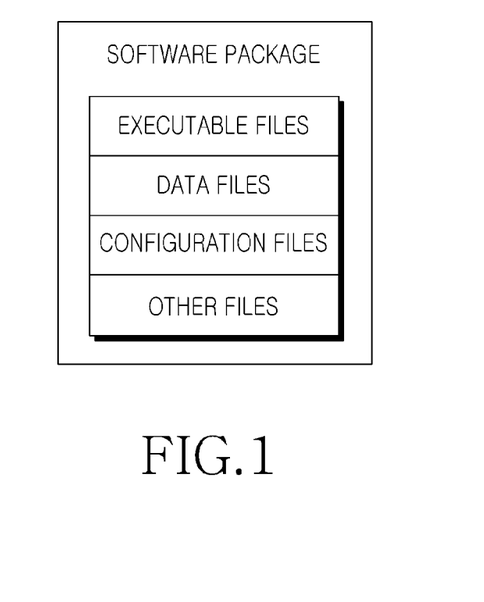
FIG. 1 is a schematic block diagram of a software package.

FIG. 1 is a schematic block diagram of a software package according to an embodiment of the present invention.

Referring to FIG. 1, the software package is a group of files related to an application to be installed in an execution environment, which can be implemented by hardware and/or software.

The software package is a package into which executable files, data files, configuration files, and other files, such as help files, are grouped. The software package may be generated by grouping the files using conventional methods. For example, the files of the software package may be grouped by being compressed using public compression software such as "GNU is Not Unix!" (GNU) ZIP or Tape Archive (TAR).

Figure 2:
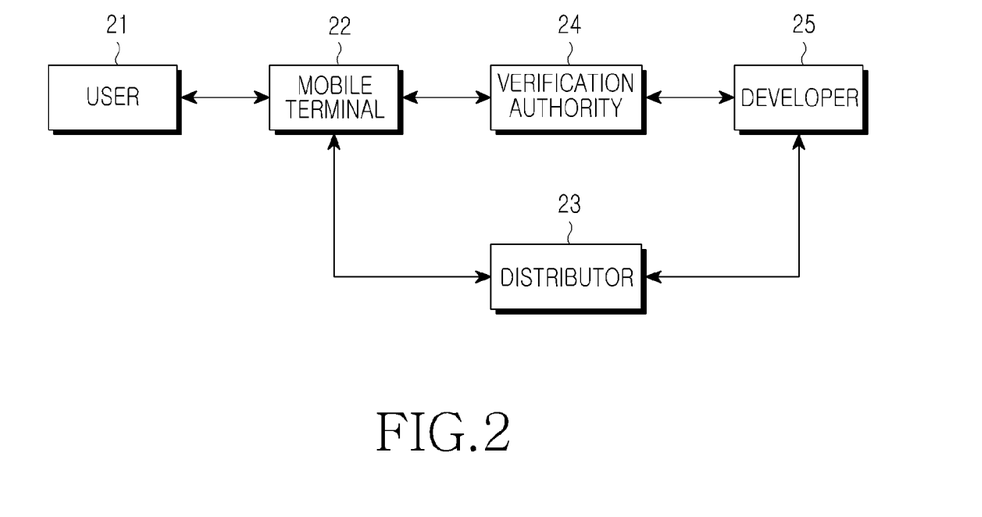
FIG. 2 is a block diagram of a system for verifying the integrity of a software package according to an embodiment of the present invention.

FIG. 2 is a block diagram of a system for verifying the integrity of a software package according to an embodiment of the present invention.

Referring to FIG. 2, according to an embodiment of the present invention, after detecting a format of a software package at the request of a user 21, a mobile terminal 22 installs files to be used by the user 21 from the software package. The mobile terminal 22 may be a portable electronic apparatus such as a portable computer and a portable phone, or the mobile terminal 22 may be any one of other similar electronic devices.

The mobile terminal 22 performs wired or wireless communication with a verification authority 24 and a distributor 23, consumes or uses a software package obtained through the communication, and verifies the integrity of the software package based on software package information received from the verification authority 24. Herein, the term "verification authority" refers to a computing device for performing verification operations, and the term "distributor" refers to a computing device for distributing information.

The mobile terminal 22 may install the software package if the verification of the integrity of the software package is successfully completed. If the verification of the integrity of the software package fails, the mobile terminal 22 may reject installation of the software package and request a user's action with respect to the verification-failed software package.

A developer 25 corresponding to a software package provides the software package to be executed on the mobile terminal 22. The developer entity 25 generates files including executable files by using development tools, and configures the software package to be executed on the mobile terminal 22 by using, for example, by grouping the generated files.

The verification authority 24 is a verification authority trusted by the mobile terminal 22 and the user 21. The verification authority 24 according to an embodiment of the present invention determines or verifies whether the software package complies with the specifications of the software package. The specifications of the software package may include a description of a software function, information about access to system resources, etc. The verification authority 24 determines whether the software package operates in compliance with the specifications of the verification authority 24 by inspecting a software source code or testing software included in the software package by executing the software.

If the software included in the software package has been successfully tested, the verification authority 24 registers and stores integrity evidence information certifying integrity of the software package.

The distributor 23 acquires the software package to be used by the user 21 from the developer 25. The distributor 23 may have a catalog of distributable software packages. The software package catalog contains the software packages and information about each of the software packages. The information about the software packages may include a unique IDentifier (ID) and a description for each software package. The distributor 23 may transmit a software package and information about the transmitted software package to the mobile terminal 22 through communications with the mobile terminal 22.

Figure 3:
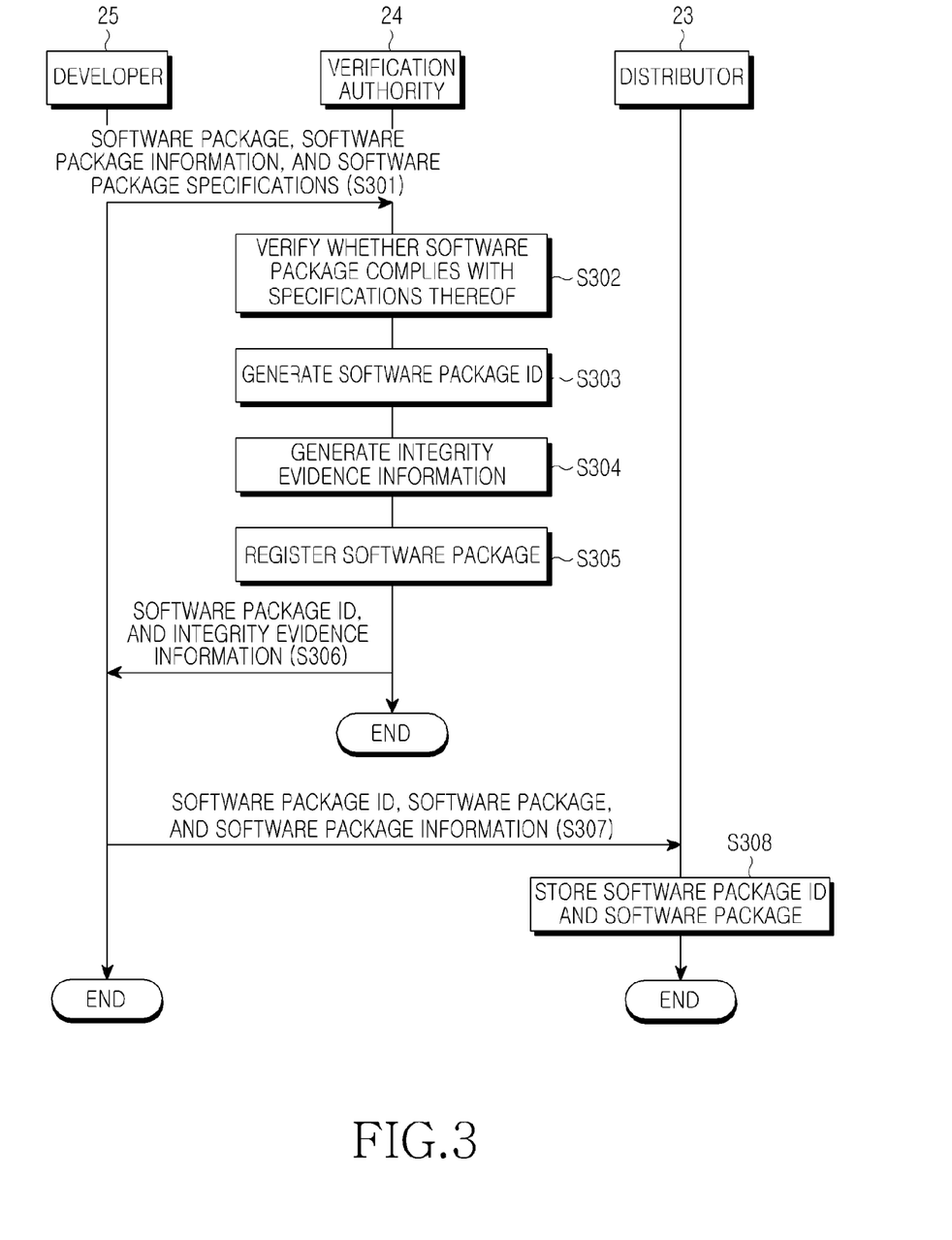
FIG. 3 is a first flowchart illustrating a method for verifying the integrity of a software package according to an embodiment of the present invention.
Figure 4:
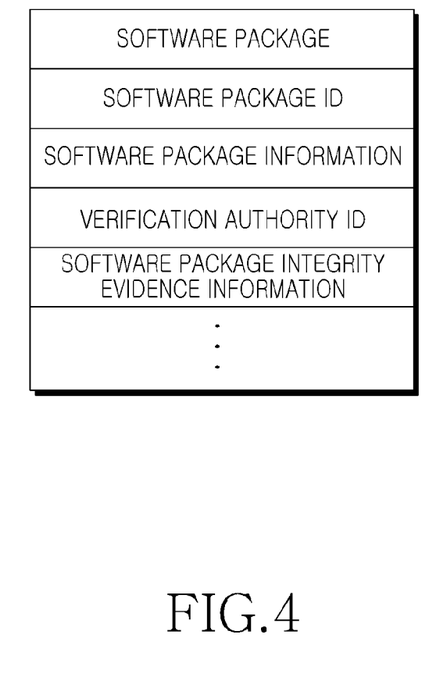
FIG. 4 is an diagram illustrating a software package and its related data stored in a database of a verification authority.

FIG. 3 is a first flowchart illustrating a method for verifying the integrity of a software package according to an embodiment of the present invention, and FIG. 4 is a diagram illustrating a software package and related data stored in a database of the verification authority 24. With reference to FIGS. 3 and 4, a process of verifying the integrity of a software package are described as follows.

Referring to FIG. 3, upon completion of development of a software package, the developer 25 transmits the software package, information about the software package, and the specifications of the software package to the verification authority 24 in step S301.

The information about the software package includes details of the software package, a method for installing the software package, and other information. The specifications of the software package may include a function of the software, the behavior of the software, system resources accessible by the software, a way to use the software, etc.

The verification authority 24 verifies whether the software package complies with the received specifications of the software package in step S302.

The verification authority 24 verifies whether the software package complies with the received specifications of the software package by analyzing a code of the software package, simulating the function of the software package, or analyzing the amount of usage of resources such as system resources, for example.

If the software included in the software package complies with the specifications of the software package, the verification authority 24 generates a software package ID for identifying the software package, in step S303, and generates integrity evidence information for the software package in step S304.

The software package ID may be a string including at least one of a developer's name, a software package name, a software package size, a software package version, a verification date, and a verification authority's name.

By generating the integrity evidence information for the software package, the verification authority 24 allows the mobile terminal 22 to determine that the software included in the software package is successfully tested in compliance with the specifications, or to determine that the software is changed in an unauthorized manner. If the integrity evidence information for the software package is generated, then it is determined that the software package operates in compliance with the specifications. However, if the integrity evidence information for the software package is not generated, then it is determined that the software package fails to comply with specifications.

Examples of the integrity evidence information for the software package may include a hash value of an encrypted hash function (or a summary function) which is continuously executed in the software package, a software package ID, information about the software package, and an ID of the verification authority. Examples of the encrypted hash function may include SHA-1, SHA-224, SHA-256, SHA-384, and SHA-512. A Secure Hash Algorithm (SHA) function is a group of encrypted hash functions that are related to each other. SHA-224, SHA-256, SHA-384, and SHA-512 are modifications of SHA-1, which are together referred to as SHA-2.

The verification authority 24 registers the software package in a database of the verification authority 24 in step S305, and transmits the software package ID and the integrity evidence information for the software package to the developer 25 in step S306.

Referring to FIG. 4, the database (not shown) of the verification authority 24 may include the software package, the software package ID, information about the software package, an ID of the verification authority 24, and integrity evidence information for the software package. If the software included in the software package fails to comply with the specifications of the software package, the verification authority 24 may reject generating the software package ID and the integrity evidence information for the software package or registering the software package.

Upon receipt of the software package ID and the integrity evidence information, the developer 25 provides the software package, the software package ID, and the information about the software package to the distributor 23, in step S307, such that the distributor 23 can later provide the software package to the mobile terminal 22. The distributor 23 stores them in step S308.

The developer 25 may transmit to the distributor 23 the software package alone or together with the software package ID and the information about the software package. The developer 25 may provide the integrity evidence information received in step S306 to the distributor 23 which may then store the provided integrity evidence information.

While it is assumed according to the embodiment of the present invention illustrated in FIG. 3, that the developer 25 transmits a software package ID, a software package, and information about the software package to the distributor 23 as in step S307, the verification authority 24 may transmit the software package ID, the software package, and the information about the software package directly to the distributor 23 after step S305 in a modified embodiment of the present invention.

Figure 5:
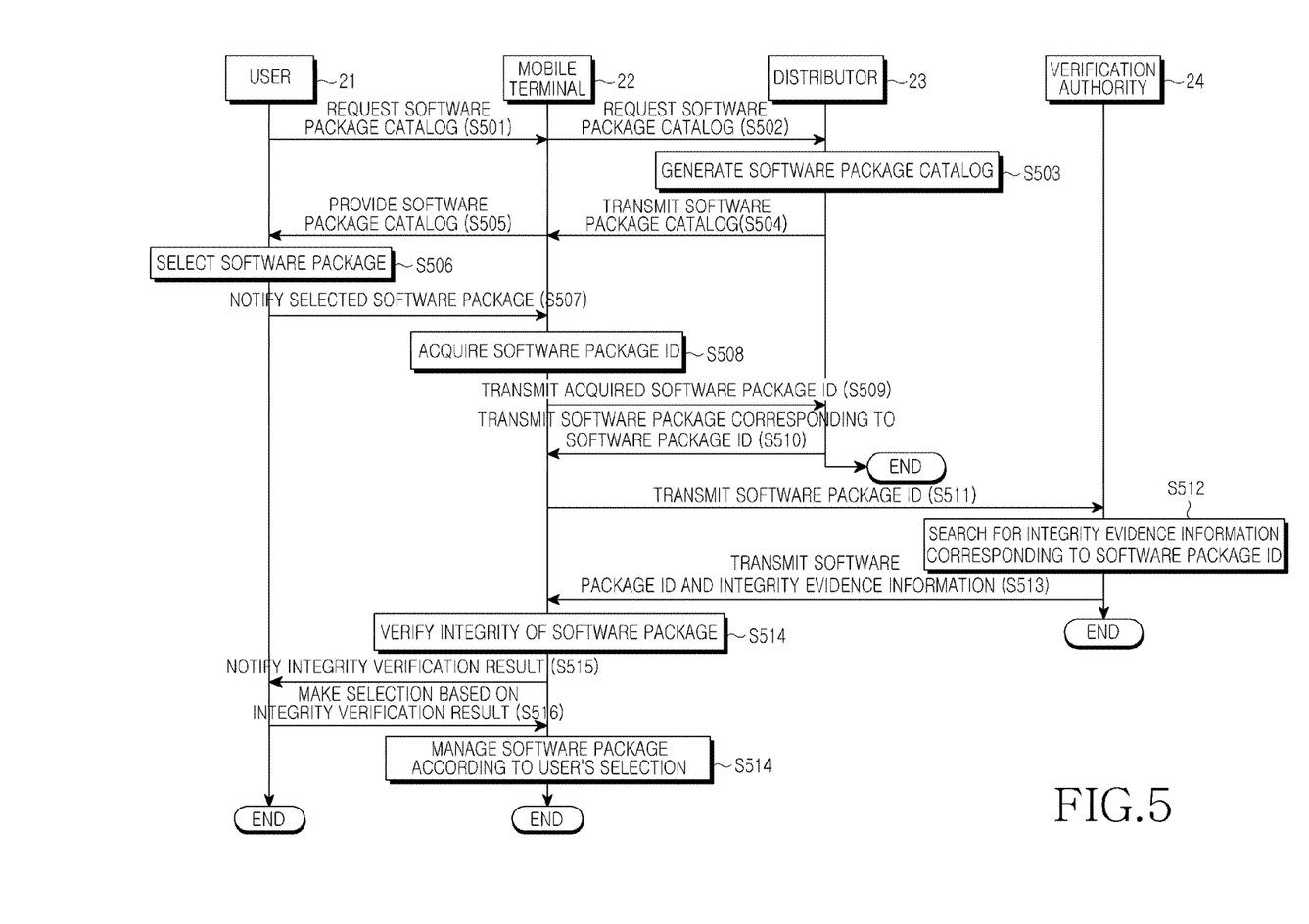
FIG. 5 is a second flowchart illustrating a method for verifying the integrity of a software package according to an embodiment of the present invention.

FIG. 5 is a second flowchart illustrating a method for verifying the integrity of a software package according to an embodiment of the present invention.

Referring to FIG. 5, if the user 21 provides input of a request to the mobile terminal 22 for requesting the mobile terminal 22 to provide a catalog for a desired software package in step S501, the mobile terminal 22 requests the distributor 23 to provide a catalog of available software packages through communication in step S502.

The distributor 23 generates the catalog of available software packages, in step S503, and transmits the generated software package catalog to the mobile terminal 22 in step S504.

The software package catalog may include a name of each software package and a software package ID corresponding to each software package. The software package catalog may further include corresponding integrity evidence information.

The mobile terminal 22 provides the catalog of available software packages received from the distributor 23 to the user 21 in step S505.

For example, the mobile terminal 22 displays the software package catalog received from the distributor 23 to the user 21 on a display unit (not shown), which may be implemented with, for example, a Liquid Crystal Display (LCD) or an Organic Light Emitting Diode (OLED), such that the user 21 can select a software package from the software package catalog displayed on the display unit.

The user 21 selects a desired software package to be installed from the software package catalog provided by the mobile terminal 22 in step S506 and notifies the mobile terminal 22 of the selected software package in step S507.

More specifically, the user 21 selects a desired software package from the software package catalog displayed on the display unit by referring to names of the software packages, and notifies the mobile terminal 22 of the selected software package through predetermined key input. For example, if the display unit is of a touch-screen display, the user 21 may notify the mobile terminal 22 of the selected software package by touching the software. If the display unit is not of a touch-screen display, the user 21 may alternatively notify the mobile terminal 22 of the desired software package by inputting an 'OK' key of a key input unit (not shown).

The mobile terminal 22 acquires a software package ID corresponding to the software package selected by the user 21 in step S508.

More specifically, the mobile terminal 22 acquires a software package ID corresponding to the software package selected by the user 21 from the received software package catalog. If a plurality of software packages are selected by the user 21, the mobile terminal 22 may check and acquire software package IDs corresponding to each of the selected software packages.

The mobile terminal 22 transmits the acquired software package ID to the distributor 23 in step S509, and the distributor 23 transmits a software package corresponding to the software package ID received from the mobile terminal 22 to the mobile terminal 22 in step S510.

After receiving the software package from the distributor 23 in step S510, the mobile terminal 22 transmits the corresponding software package ID to the verification authority 24 in step S511. The verification authority 24 then searches for integrity evidence information corresponding to the software package ID in step S512, and transmits the software package ID and the found integrity evidence information corresponding thereto to the mobile terminal 22 in step S513.

The verification authority 24 searches for the integrity evidence information corresponding to the software package ID received from the mobile terminal 22, such that if the integrity evidence information is found, the verification authority 24 transmits the software package ID and the integrity evidence information to the mobile terminal 22.

If no integrity evidence information is found, the verification authority 24 may transmit an error message to the mobile terminal 22. For example, the error message may be an alarm message, indicating that no integrity evidence information is found. The error message may include information about a software package ID for which a search for integrity evidence information is attempted.

After receiving the software package ID and the integrity evidence information from the verification authority 24, the mobile terminal 22 verifies the integrity of the software package in step S514 and notifies the user 21 of the verification result in step S515.

The mobile terminal 22 compares the integrity evidence information for the software package previously received from the distributor 23, for example, received in step S504, with the integrity evidence information received in step S513. If the integrity evidence information received in steps S504 and S513 match, the mobile terminal 22 notifies the user 21 of the result of the matching. Thereafter, if installation of the software package is requested by the user 21, the mobile terminal 22 installs the software package in the mobile terminal 22 by using a management function of the software package.

If the integrity evidence information for the software package received ins step S504 does not match the integrity evidence information received in step S513, or if the mobile terminal 22 receives the error message, for example, the error message that may be received in step S513 according to the search result of step S512, from the verification authority 24, the mobile terminal 22 notifies the user 21 that the verification of the integrity of the software package has failed. Methods by which the mobile terminal 22 notifies the user 21 of the result of the integrity verification may include visual notification using the display unit (not shown), acoustic notification using a sound output unit (not shown), or a combination of the visual notification and the acoustic notification.

When the user 21 provides input of a selection of whether to install the software package based on the integrity verification result in step S516, the mobile terminal 22 manages the software package according to the user's selection in step S517.

The user 21 may select whether to install the software package based on the integrity verification result by using the display unit or the key input unit including a touch screen. The user 21 may select to install the software package in spite of a failure in the integrity verification with respect to the software package. If the mobile terminal 22 receives input of a request to install the software package from the user 21, the mobile 22 installs the software package by using a management function of the software package. If the mobile terminal 22 is not requested to so install the software package, the mobile terminal 22 cancels the installation of the software package. The user 21 or the mobile terminal 22 may provide a setting such that the installation-canceled software package is deleted from the mobile terminal 22.

As is apparent from the foregoing description, systems and methods according to embodiments of the present invention do not require a complex public key structure and verify the integrity of software packages without modular operations, thereby reducing the number of operations and time required for the integrity verification.

While the present invention has been shown and described with reference to an embodiment thereof, it will be understood by those skilled in the art that various changes in form and details may be made therein without departing from the spirit and scope of the invention as defined by the appended claims.

What is claimed is:

1. A method for verifying integrity of a software package in a mobile terminal, the method comprising:
   acquiring a software package identifier (ID) corresponding to a software package selected from a catalog of available software packages, wherein the catalog of available software packages is received from a distribution computer;
   transmitting the software package ID to the distribution computer and a verification computer;
   receiving the selected software package and second integrity evidence information corresponding to the software package ID from the distribution computer;
   receiving first integrity evidence information from the verification computer;
   determining whether integrity of the selected software package is verified by comparing the second integrity evidence information, received from the distribution computer, with the first integrity evidence information; and
   outputting a notification for notifying a user of a result of the determination and managing the selected software package according to a received selection,
   wherein the determining whether integrity of the selected software package is verified comprises:
   determining whether the second integrity evidence information, received from the distribution computer, is equivalent to the first integrity evidence information, received from the verification computer, by comparing the second integrity evidence information with the first integrity evidence information;
   if the second integrity evidence information, received from the distribution computer, is equivalent to the first integrity evidence information, received from the verification computer, determining that the integrity of the selected software package is verified; and
   if the second integrity evidence information, received from the distribution computer, is not equivalent to the first integrity evidence information, received from the verification computer, determining that the integrity of the selected software package is not verified,
   wherein the first integrity evidence information and the second integrity evidence information include a hash value of an encrypted hash function that is executed in the selected software package.

2. The method of claim 1, further comprising:
   requesting the distribution computer to provide the catalog of available software packages if a user-request for a catalog for a desired software package is received;
   receiving the catalog generated by the distribution computer in response to the request; and
   displaying the catalog received from the distribution computer.

3. The method of claim 1, wherein the first integrity evidence information is received from the verification computer, if the first integrity evidence information corresponding to the software package ID is found by the verification computer.

4. The method of claim 3, further comprising:
   receiving information indicating that the first integrity evidence information does not exist from the verification computer, if the first integrity evidence information is not found by the verification computer.

5. The method of claim 1, wherein managing the selected software package comprises:
   outputting the notification to notify the user that the integrity of the selected software package is verified, if it is determined that the integrity of the selected software package is verified; and proceeding with installation of the selected software package upon receiving a user-request to install the selected software package.

6. The method of claim 1, wherein managing the selected software package comprises:

notifying the user that the integrity of the selected software package is not verified, if it is determined that the integrity of the selected software package is not verified; and proceeding with installation of the selected software package upon receiving a user-request to install the selected software package.

7. The method of claim 1, wherein managing the selected software package comprises:

outputting the notification to notify the user that the integrity of the selected software package is not verified, if it is determined that the integrity of the selected software package is not verified; and deleting the selected software package upon receiving a user-request to delete the selected software package.

8. The method of claim 1, wherein first integrity evidence information of each of the available software packages is generated by the verification computer, if each of the available software packages complies with a specification of each of the available software packages and is stored in the verification computer.

9. The method of claim 8, wherein the first integrity evidence information is generated by the verification computer and transmitted to the distribution computer.

10. The method of claim 8, wherein the first integrity evidence information and the software package ID are transmitted from the verification computer to a developer of the selected software package.

11. The method of claim 10, wherein the developer transmits the software package ID, a software package corresponding to the software package ID, and the first integrity evidence information for the software package to the distribution computer, and the distribution computer stores the software package ID, the software package, and the first integrity evidence information for the software package transmitted from the developer.

12. The method of claim 1, wherein the selected software package is received from the distribution computer through at least one of wired communication and wireless communication.

13. A mobile terminal for verifying integrity of a software package in the mobile terminal, the mobile terminal comprising:

a communication unit configured to receive a catalog of available software packages from a distribution computer; and a processor configured to:

acquire a software package identifier (ID) corresponding to a software package selected from the catalog, transmit the software package ID to the distribution computer and a verification computer via the communication unit, receive the selected software package and second integrity evidence information corresponding to the software package ID from the distribution computer via the communication unit, determine whether integrity of the selected software package is verified by comparing the second integrity evidence information, received from the distribution computer, with first integrity evidence information if the first integrity evidence information is received from the verification computer, and output a notification for notifying a user of a result of the determination and manage the selected software package according to a received selection, wherein the processor is further configured to:

determine whether the second integrity evidence information, received from the distribution computer, is equivalent to the first integrity evidence information, received from the verification computer, by comparing the second integrity evidence information with the first integrity evidence information, determine that the integrity of the selected software package is verified if the second integrity evidence information, received from the distribution computer, is equivalent to the first integrity evidence information, received from the verification computer, and determine that the integrity of the selected software package is not verified if the second integrity evidence information, received from the distribution computer, is not equivalent to the first integrity evidence information, received from the verification computer, wherein the first integrity evidence information and the second integrity evidence information include a hash value of an encrypted hash function that is executed in the selected software package.

14. The mobile terminal of claim 13, wherein the processor requests the distribution computer to provide the catalog of available software packages, if a user request for a catalog for a desired software package is received, and displays the catalog if the communication unit receives the catalog generated by the distribution computer in response to the request.

15. The mobile terminal of claim 13, wherein the first integrity evidence information is received from the verification computer, if the first integrity evidence information corresponding to the software package ID is found by the verification computer.

16. The mobile terminal of claim 15, wherein the communication unit receives information indicating that the integrity evidence information does not exist from the verification computer, if the first integrity evidence information is not found by the verification computer.

17. The mobile terminal of claim 13, wherein the processor outputs the notification to notify the user that the integrity of the selected software package is verified, if it is determined that the integrity of the selected software package is verified, and proceeds with installation of the selected software package upon receiving a user-request to install the selected software package.

18. The mobile terminal of claim 13, wherein the processor notifies the user that the integrity of the selected software package is not verified, if it is determined that the integrity of the selected software package is not verified, and proceeds with installation of the selected software package upon receiving a user-request to install the selected software package.

19. The mobile terminal of claim 13, wherein the processor outputs the notification to notify the user that the integrity of the selected software package is not verified, if it is determined that the integrity of the selected software package is not verified, and deletes the selected software package upon receiving a user-request to delete the selected software package.

20. The mobile terminal of claim 13, wherein the first integrity evidence information of each of the available software packages is generated by the verification computer, if each of the software available packages complies with a specification of each of the available software packages and is stored in the verification computer.

21. The mobile terminal of claim 20, wherein the first integrity evidence information is generated by the verification computer and transmitted to the distribution computer.

22. The mobile terminal of claim 20, wherein the first integrity evidence information and the software package ID are transmitted from the verification computer to a developer of the selected software package.

23. The mobile terminal of claim 22, wherein the developer transmits the software package ID, a software package corresponding to the package ID, and the first integrity evidence information for the software package to the distribution computer, and the distribution computer stores the software package ID, the software package, and the first integrity evidence information for the software package transmitted from the developer.

24. The mobile terminal of claim 13, wherein the mobile terminal receives the selected software package from the distribution computer through at least one of wired communication and wireless communication.

* * * * *